US012601640B2

(12) United States Patent
Casey et al.

(10) Patent No.: US 12,601,640 B2
(45) Date of Patent: Apr. 14, 2026

(54) CURRENT SENSING NOISE THERMOMETER

(71) Applicant: Royal Holloway and Bedford New College

(72) Inventors: Andrew James Casey, Egham (GB); John Saunders, Egham (GB); Lev Vitalievich Levitin, Egham (GB); Harriet Van Der Vliet, Oxfordshire (GB)

(73) Assignee: Royal Holloway and Bedford New College, Egham (GB)

( * ) Notice: Subject to any disclaimer, the term of this patent is extended or adjusted under 35 U.S.C. 154(b) by 686 days.

(21) Appl. No.: 18/050,217

(22) Filed: Oct. 27, 2022

(65) Prior Publication Data

US 2023/0098909 A1      Mar. 30, 2023

Related U.S. Application Data

(63) Continuation of application No. PCT/EP2021/063143, filed on May 18, 2021.

(30) Foreign Application Priority Data

May 26, 2020     (GB) ...................................... 2007785

(51) Int. Cl.
*G01K 7/30*            (2006.01)
(52) U.S. Cl.
CPC ...................................... *G01K 7/30* (2013.01)
(58) Field of Classification Search
None
See application file for complete search history.

(56) References Cited

U.S. PATENT DOCUMENTS

| | | | |
|---|---|---|---|
| 3,878,723 A | 4/1975 | Blalock et al. | |
| 3,937,086 A | 2/1976 | Von Thuna | |
| 3,956,936 A | 5/1976 | Brixy | |
| 4,099,413 A | 7/1978 | Ohte et al. | |
| 4,278,828 A | 7/1981 | Brixy et al. | |

(Continued)

FOREIGN PATENT DOCUMENTS

| | | |
|---|---|---|
| CA | 1223456 | 6/1987 |
| DE | 2347765 | 4/1975 |

(Continued)

OTHER PUBLICATIONS

Casey et al., "Current Sensing Noise Thermometry: A fast practical solution to low temperature measurement", J Low Temp Phys 175, 764-775 (2014).

(Continued)

*Primary Examiner* — Erica S Lin
(74) *Attorney, Agent, or Firm* — Levine Bagade Han LLP

(57) ABSTRACT

A current sensing noise thermometer comprising: a sensor resistor thermally coupled to a target to be measured; a superconducting coil; superconducting thermal breaks between respective ends of the sensor resistor and respective ends of the superconducting coil; and a superconducting flux sensor; wherein the sensor resistor, superconducting coil and superconducting thermal breaks form a loop inductively coupled to the superconducting flux sensor. There may be a noise filter between the sensor resistor and the superconducting coil.

20 Claims, 2 Drawing Sheets

(56) References Cited

U.S. PATENT DOCUMENTS

| | | | | |
|---|---|---|---|---|
| 4,479,026 | A | 10/1984 | Brixy et al. | |
| 4,506,996 | A | 3/1985 | Nara | |
| 5,228,780 | A | 7/1993 | Shepard et al. | |
| 5,746,511 | A | 5/1998 | Eryurek et al. | |
| 6,357,912 | B1 | 3/2002 | Li | |
| 6,607,301 | B1 | 8/2003 | Glukhovsky et al. | |
| 2007/0030629 | A1* | 2/2007 | Asami | H01G 9/042 |
| | | | | 361/528 |
| 2010/0006142 | A1 | 1/2010 | Li et al. | |
| 2010/0229941 | A1* | 9/2010 | Matsui | H01G 9/2031 |
| | | | | 438/85 |
| 2012/0135867 | A1* | 5/2012 | Thom | H01P 1/202 |
| | | | | 333/167 |
| 2018/0090662 | A1* | 3/2018 | Stevenson | H01L 21/027 |
| 2022/0122749 | A1* | 4/2022 | Masluk | H01R 12/63 |

FOREIGN PATENT DOCUMENTS

| | | | | |
|---|---|---|---|---|
| DE | 4212618 | 10/1993 | | |
| DE | 10226619 | 1/2004 | | |
| EP | 0982574 | 3/2000 | | |
| EP | 0982574 B1 * | 2/2007 | | G01K 7/30 |
| GB | 1389076 | 4/1975 | | |
| GB | 2545176 | 6/2017 | | |
| SE | 394323 | 9/1977 | | |
| UA | 25389 | 8/2007 | | |
| WO | WO 2012/007736 | 1/2012 | | |

OTHER PUBLICATIONS

Fleischmann et al., "Noise Thermometry for Ultralow Temperatures", Journal of Low Temperatures Physics, 201, pp. 803-824, (2020).

Lusher et al., "Current sensing noise thermometry using a low Tc DC SQUID preamplifier; Current sensing noise thermometry", Measurement Science and Technology, 12(1), pp. 1-15 (2001).

Schwab et al., "Measurement of the quantum of thermal conductance", Nature 404, 974-977, (2000).

Schwab et al., "Thermal conductance through discrete quantum channels", Physica E 9, pp. 60-68, (2001).

Shibahara et al., "Primary current-sensing noise thermometry in millikelvin regime", Royal Society of London. Philosophical Transactions. Mathematical, Physical and Engineering Sciences, 374(2064), (2016).

Van der Vliet, Harriet., "Platforms for new quantum technologies—addressing the challenges in cooling and exploring the properties of strongly correlated electron systems.", Abstract of Thesis, University of London, Royal Holloway (2018).

* cited by examiner

CURRENT SENSING NOISE THERMOMETER

CROSS-REFERENCE TO RELATED APPLICATIONS

This application is a continuation of International Patent Application Number PCT/EP2021/063143 filed May 18, 2021, which claims the benefit of priority to GB 2007785.5 filed May 26, 2020, the contents of which are incorporated herein by reference in their entireties.

FIELD OF TECHNOLOGY

The present invention relates to apparatus and methods for measuring very low temperatures, e.g., in the range of a few millikelvin.

BACKGROUND

A conventional approach for the measurement of temperatures below about 4 K and down to the millikelvin range is based on the use of a current sensing noise thermometer as described in U.S. Pat. No. 6,357,912B1. FIG. 1 of the accompanying drawings is a schematic diagram of such a device. A grounded sensor resistor Ro is connected in series with a superconducting coil L, and connected with a SQUID input coil Lo as shown. The grounding of the sensor resistor allows it to be cooled to a temperature of a few micro kelvin. Lo is inductively coupled to a SQUID and all connections to the sensor resistor are preferably made from superconducting material, in order not to provide any additional Johnson noise. Temperature measurements are made by measurement of the noise current density and calibrated based on the known temperature at the point where a change in inductance of the coil due to the Meisner effect is observed.

In the prior art the heat leak into sensor resistor $R_0$, is of the order of 10 pW. The heat leak generates a temperature gradient between the thermometer and the object of interest. To achieve an acceptable temperature gradient and obtain the lowest achievable temperature, only low resistance value sensors can be used. The low values of resistors used to meet these constraints in the prior art results in low bandwidth systems and hence long measurement times.

SUMMARY

The conventional current sensing noise thermometer has a drawback that parasitic heat leaks into the device limit its speed of operation at the lowest temperatures.

An improved thermometer capable of measuring temperatures below about 4 K and preferably in the millikelvin range is desirable.

According to the present invention, there is provided a current sensing noise thermometer comprising: a sensor resistor thermally coupled to a target to be measured; a superconducting coil; superconducting thermal breaks between respective ends of the sensor resistor and respective ends of the superconducting coil; and a superconducting flux sensor; wherein the sensor resistor, superconducting coil and superconducting thermal breaks form a loop inductively coupled to the flux sensor.

Embodiments of the invention can achieve heat leaks below 1 fW.

BRIEF DESCRIPTION OF THE DRAWINGS

Exemplary embodiments of the present invention are described below with reference to the accompanying drawings, in which.

DETAILED DESCRIPTION

Figure 1:
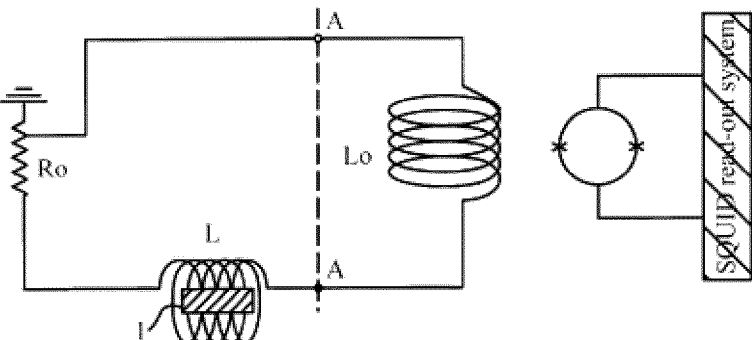
FIG. 1 is a schematic diagram of a prior art current sensing noise thermometer.

In the drawings, like parts are identified by like references.

Figure 2:
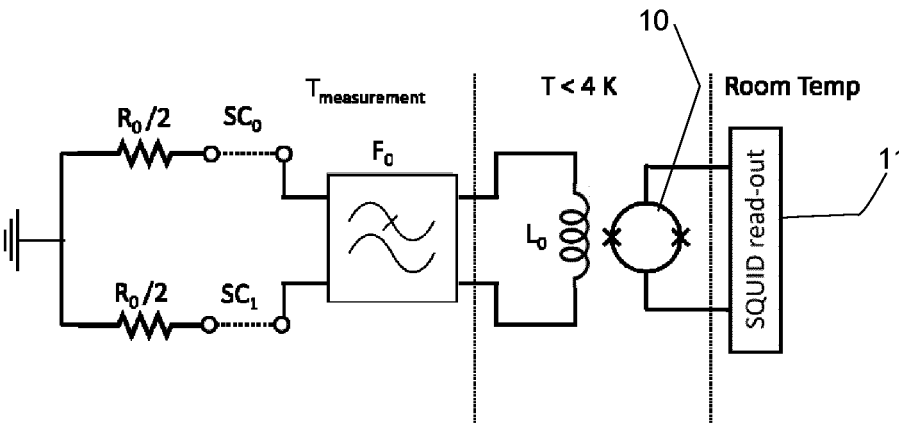
FIG. 2 is a schematic diagram of a current sensing noise thermometer according to a first embodiment.

FIG. 2 is a schematic diagram of an ultra-low heat leak, fast, current sensing noise thermometer. Sensing resistor $R_0$, is electrically connected at or near its midpoint to a target to be measured. Sensing resistor $R_0$ is connected via superconducting thermal breaks $SC_0$, $SC_1$ and filter $F_0$ to input coil $L_0$. The superconducting input coil $L_0$ is inductively coupled to a flux sensor 10, e.g., a SQUID or HyQUID, which is electrically coupled to a read-out circuit 11. Sensing resistor $R_0$, superconducting thermal breaks $SC_0$, $SC_1$, filter $F_0$ and input coil $L_0$ form a single loop which is directly inductively coupled to flux sensor 10. This enables a large bandwidth, e.g., about 1 MHz, and therefore enables fast measurement. Desirably no transformer is provided between the sensor loop and the flux sensor.

Positioning the electrical connection to the target at the midpoint of sensing resistor $R_0$ reduces temperature gradients in the device. It is desirable that the connection is as close as possible to the midpoint, e.g., with about 10% of the length of the resistor, since the benefit falls away as the connection is further from the midpoint. Desirably the resistance of the connection between the sensing resistance and the target is much less than the resistance of the sensing resistor itself. The resistance of the connection may be of the order of tens of mΩ to nΩ.

The sensor resistor $R_0$, superconducting thermal breaks $SC_0$, $SC_1$ and filter $F_0$ are within the environment of the target whose temperature is to be measured and in the equilibrium state can be considered to be at the measurement temperature $T_{measurement}$. The input coil $L_0$ and flux sensor 10 need only be kept at a low enough temperature to be superconducting, e.g., below about 4 K or about 1K if an Aluminum HyQUID is used as the flux sensor. The read-out circuit 11 operates at room temperature.

Sensing resistor $R_0$ can have a resistance in the range of from 20 mΩ to 100Ω, desirably 100 mΩ to 5Ω, most desirably about 200 mΩ to 2Ω. The optimum resistor may depend on the temperature to be measured, with lower resistances being better for lower temperature but with longer measurement times. Sensing resistor $R_0$ can be made of a Platinum-Tungsten alloy PtW or other materials such as BeCu or brass. The sensing resistor $R_0$ may be in the form of wire, e.g., of diameter of the order of 50 μm and length about 0.1 to 10 mm. A wire resistor using a material with a relatively high resistivity can be made smaller than copper foil resistors used in some prior art designs. A wire resistor can be made freestanding, e.g., supported only by the connections to the target and/or the superconducting thermal breaks. Making the sensor resistor freestanding improves its isolation from parasitic heat input. Sensing resistor $R_0$ must not be superconducting. Desirably the sensing resistor $R_0$ has a weak temperature dependence of resistivity, which is the case for most alloys. It is also desirable that the material of the sensing resistor $R_0$ has a low magnetoresistance, which enables the device to be used in high external magnetic fields, e.g., from 0.1 to 10 T. Sensing resistor $R_0$ can be spot welded or wire bonded to the superconducting thermal breaks $SC_0$, $SC_1$. Sensor resistor $R_0$ may be part of another device, e.g., a qubit, whose temperature is to be measured.

The connection between sensor resistor $R_0$ and the target to be measured is desirably made via a high thermal conductivity wire. For example copper or gold wires can be used. A direct connection between the target and the sensor resistor $R_0$ enables the temperature of a specific component to be measured directly, rather than the more general environment of the component as with prior designs. In addition a faster measurement can be made, in some cases requiring of the order of less than a second. A connection via wire can also reduce or avoid perturbing the target to be measured. A conductive connection also enables the temperature of an electron gas (e.g., a two-dimensional electron gas) to be measured directly rather than inferred from a measurement of the temperature of the platform of the electron gas.

Superconducting thermal breaks $SC_0$, $SC_1$ are desirably connected directly to sensor resistor $R_0$. In prior art devices a resistive sensor is connected to a SQUID input coil via NbTi superconducting wire (typically 100 µm diameter). In an embodiment of the invention the superconducting thermal breaks $SC_0$, $SC_1$ have a low thermal conductance and can be formed using 10-50 µm diameter bare superconducting wire (e.g., Aluminum or Niobium) wire. Desirably the superconducting thermal breaks $SC_0$, $SC_1$ have a thermal conductance less than or equal to 10 nW/K, more desirably less than or equal to 1 nW/K, most desirably less than or equal to 0.5 nW/K. In an embodiment, the thermal conductance is about 0.2 nW/K. Niobium is desirable in high-filed applications. The superconducting breaks can be wire bonded or spot welded to the resistive sample and/or to a superconducting wire connecting to input coil $L_0$. Superconducting thermal breaks $SC_0$, $SC_1$ reduce the heat input from the higher temperature (<4 K) environment of the coil $L_0$ and flux sensor 10 and therefore enable a more accurate and quicker temperature measurement to be performed.

Filter $F_0$ is a noise filter that is configured to prevent high frequency noise propagating to the sensor resistor $R_0$ and thereby introducing heat. Filter $F_0$ is desirably a low pass filter e.g., with a cut off frequency of about 100 MHz or more. Desirably filter $F_0$ is configured to prevent electromagnetic energy, e.g., GHz noise in a SQUID acting as flux sensor 10, from propagating to the sensor resistor $R_0$. It is desirable if the temperature of filter $F_0$ is close to the target measurement temperature as possible in order to reduce thermal noise coupled into the circuit from the normal metal components of the filter.

An advantageous form of filter that can be used in the invention is a thread filter, for example comprising a twisted pair of superconducting wires wound on a threaded conductive core and embedded in a metal-loaded epoxy material. The superconducting wires of the thread filter may be of length about 10 cm to 1 m, with shorter lengths being more suitable for lower temperatures. The walls of the thread shield adjacent turns of the superconducting wire from each other. The core may be made of sterling-silver or copper and is desirably not superconducting so that it can be cooled more easily. Desirably the metal-loaded epoxy material has a high density of metal particles but is not conductive. The metal particles are desirably a non-ferrous metal, e.g., silver, copper, platinum or gold. The inventors have determined that in some cases it is desirable to control the temperature of curing of the epoxy to ensure the metal-loaded epoxy does not become conductive. The metal-loaded epoxy material may be coated onto the core before winding of the twisted pair, then more metal-loaded epoxy material coated after winding to completely surround the twisted pair. An outer sleeve of the same material as the core may also be provided to shield the filter from external fields.

Flux sensor 10 is inductively coupled to coil $L_0$ and may be a SQUID (desirably a DC SQUID, i.e. a superconducting loop including two Josephson junctions) or a HyQUID (a superconducting loop interrupted by a normal conducting segment and having an interferometer connected to the normal conducting segment—see for example WO 2012/007736A1). Flux sensor 10 functions to pick-up and amplify Johnson noise (also known as Johnson-Nyquist noise or thermal noise) in the sensor resistor $R_0$ so that it can be measured by read-out circuit 11. This enables the temperature of the sensor resistor to be determined since the Johnson noise power density is linearly related to temperature via the Boltzmann constant. The noise thermometer can be calibrated by reference to the superconducting transitions of the superconductors in the device, e.g., the superconducting thermal breaks $SC_0$, $SC_1$.

Figure 3:
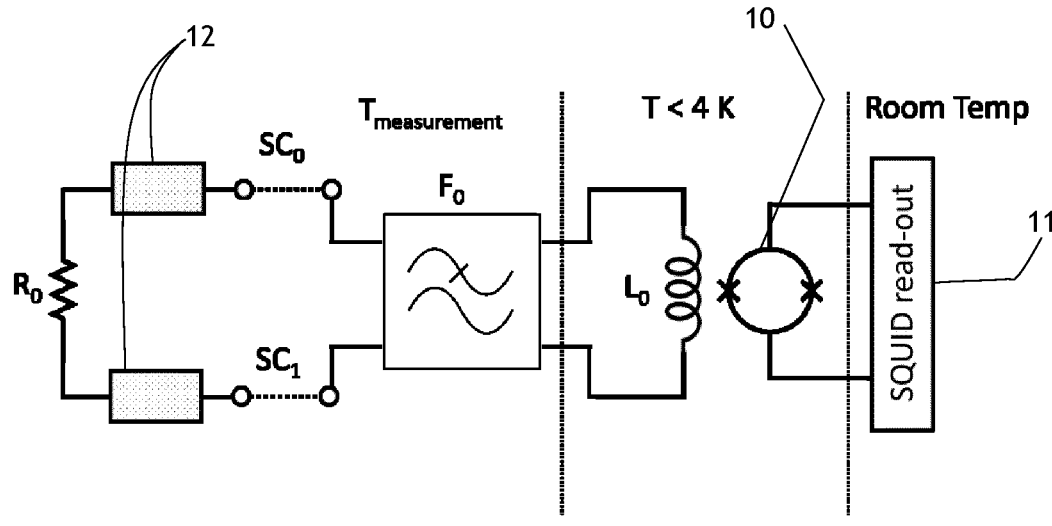
FIG. 3 is a schematic diagram of a current sensing noise thermometer according to a second embodiment.

FIG. 3 depicts another embodiment of the invention which may be referred to as a Helium immersion current sensing noise thermometer. Parts of the embodiment of FIG. 3 that are the same as parts of the embodiment of FIG. 2 are indicated by the same references and are not described further below in the interests of brevity.

In the embodiment of FIG. 3, the sensor resistor $R_0$ is electrically isolated from the target to be measured and instead is thermally coupled to the target via one or more leads, which are covered in silver sinter and immersed in liquid helium, e.g., helium-3 ($^3$He), baths 12. Both leads can be immersed in one bath. The sensor resistor can also be located in the liquid helium bath. The silver sinter increases the thermal conduction between the helium and the leads by increasing the contact surface area. The use of two leads to couple the sensor resistor to the target provides a balanced system, in the same way as the midpoint connection in the embodiment of FIG. 1.

Figure 4:
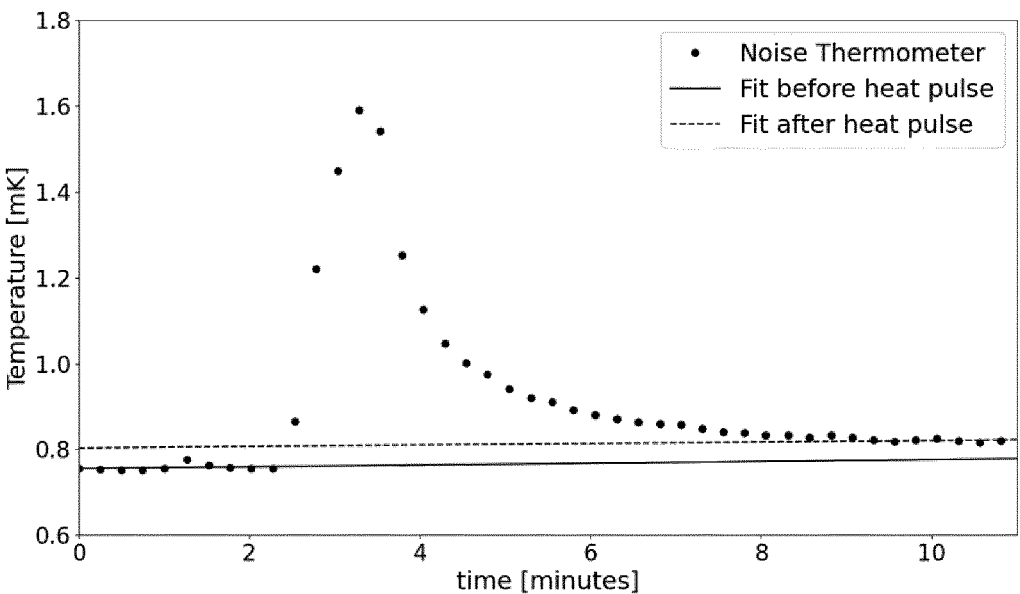
FIG. 4 is a graph of temperature data measured using an embodiment of the invention.

Embodiments of the present invention can reduce the heat leak into the fW range, this allows for the use of a sensor resistor having a much larger resistance, increasing the bandwidth and hence decreasing the measurement time required. FIG. 4 depicts a sequence of measurements taken by a thermometer according to an embodiment of the invention. Measurements were able to be taken approximately every 15 seconds revealing the shape of the sample's response to an applied heat pulse. In addition the heat capacity of the sample can be determined from the distance between the horizontal lines, which represent the average temperature before (solid line) and after the applied heat pulse (dashed line). Such measurements are not possible with prior art designs that commonly provide a measurement representing an average temperature over a period of several minutes.

An embodiment of the invention can be made smaller than some prior art devices which makes it easier to fit the device into available space, reduces the heat capacity of the thermometer, and allows multiple thermometers to be attached.

In particular the metal-loaded epoxy thread filters with superconducting wires act as low-pass filters ($F_0$), filtering out potential high frequency noise that could heat the sensor resistor.

In addition the increased bandwidth means that it is possible to measure the temperature in higher magnetic field environments (because noise caused by vibrations in the magnetic field no longer dominates the spectrum and can be ignored when fitting to extract the temperature).

The present invention therefore provides a fast, compact, high field, low dissipation precise noise thermometer that can be used in a variety of fields, in particular measurements in many quantum technologies, such as determining the temperature of quantum information system components, e.g., qubits. By achieving fast measurements at high precision (e.g., 1% precision in less than 1 s) new types of measurement become possible, for example measurement of heat capacity at very-low temperatures. The invention is particularly applicable to investigation of the fractional quantum Hall effect by enabling accurate measurement of the temperature of a two-dimensional electron gas. The present invention can be used for calibration of other devices, e.g., other forms of low-temperature thermometer. Embodiments of the present invention can operate in magnetic fields of up to 10 Tesla. Embodiments of the present invention can measure temperatures below about 9 K, desirably below 4 K and more desirably in the range of 0.1 to 100 mK.

Having described embodiments of the invention it will be appreciated that the foregoing embodiments are exemplary and not prescriptive. Variations may be made within the scope of the invention, which is defined by the appended claims.

We claim:

1. A current sensing noise thermometer comprising: a sensor resistor thermally coupled to a target to be measured; a superconducting coil; superconducting thermal breaks between respective ends of the sensor resistor and respective ends of the superconducting coil, the superconducting thermal breaks SCo, SC$_1$ having a thermal conductance less than or equal to 10 nW/K; and a superconducting flux sensor; wherein the sensor resistor, superconducting coil and superconducting thermal breaks form a loop inductively coupled to the superconducting flux sensor.

2. The current sensing noise thermometer according to claim 1 wherein the superconducting thermal breaks comprise a wire, desirably of Nb or Al.

3. The current sensing noise thermometer according to claim 1 wherein the superconducting thermal breaks are connected to the sensor resistor by a wire bond or spot welding technique.

4. The current sensing noise thermometer according to claim 1 wherein the superconducting thermal breaks SCo, SC$_1$ have a thermal conductance conductivity less than or equal to 1 nW/K, most desirably less than or equal to 0.5 nW/K.

5. The current sensing noise thermometer according to claim 1 further comprising a noise filter between the sensor resistor and the superconducting coil.

6. The current sensing noise thermometer according to claim 5 wherein the noise filter is a low pass filter desirably with a cut-off frequency above about 100 MHz.

7. The current sensing noise thermometer according to claim 5 wherein the noise filter is a thread filter with superconducting wires, desirably embedded in a non ferrous metal loaded epoxy.

8. The current sensing noise thermometer according to claim 1 wherein the midpoint of the sensor resistor is electrically coupled to the target.

9. The current sensing noise thermometer according to claim 1 wherein the sensor resistor is electrically isolated from the environment.

10. The current sensing noise thermometer according to claim 9 wherein the sensor resistor is thermally coupled to the target via leads immersed in liquid He.

11. The current sensing noise thermometer according to claim 10 wherein the leads are coated with silver sinter.

12. The current sensing noise thermometer according to claim 1 wherein the sensor-resistor is incorporated into another device, e.g. a qubit.

13. Use of the current sensing noise thermometer according to claim 1 for measuring the temperature of a qubit.

14. Use of the current sensing noise thermometer according to claim 1 for measuring the temperature of a target in a high magnetic field.

15. Use of the current sensing noise thermometer according to claim 1 for measuring the temperature of an electron gas.

16. Use of the current sensing noise thermometer according to claim 1 for calibrating another device.

17. The current sensing noise thermometer according to claim 7, wherein the superconducting wires are embedded in a non-ferrous metal-loaded epoxy.

18. The current sensing noise thermometer according to claim 17, wherein the superconducting wires comprise a core which is not conductive.

19. The current sensing noise thermometer according to claim 2, wherein the wire is a wire of Nb or Al.

20. The current sensing noise thermometer according to claim 6, wherein the low pass filter has a cut-off frequency above about 100 MHz.

* * * * *